United States Patent
Srinivasan et al.

(10) Patent No.: US 11,653,031 B2
(45) Date of Patent: May 16, 2023

(54) DELAYED DUPLICATE I-PICTURE FOR VIDEO CODING

(71) Applicant: Texas Instruments Incorporated, Dallas, TX (US)

(72) Inventors: Ranga Ramanujam Srinivasan, Bengaluru (IN); Chaitanya Satish Ghone, Pune (IN); Mihir Narendra Mody, Bengaluru (IN); Minhua Zhou, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/093,695

(22) Filed: Nov. 10, 2020

(65) Prior Publication Data

US 2021/0058645 A1    Feb. 25, 2021

Related U.S. Application Data

(63) Continuation of application No. 15/905,588, filed on Feb. 26, 2018, now Pat. No. 10,869,064, which is a
(Continued)

(51) Int. Cl.
*H04N 19/895* (2014.01)
*H04N 19/172* (2014.01)
(Continued)

(52) U.S. Cl.
CPC ......... *H04N 19/895* (2014.11); *H04N 19/107* (2014.11); *H04N 19/172* (2014.11); *H04N 19/39* (2014.11); *H04N 19/65* (2014.11)

(58) Field of Classification Search
CPC .. H04N 19/172; H04N 19/107; H04N 19/895; H04N 19/65; H04N 19/39
See application file for complete search history.

(56) References Cited

U.S. PATENT DOCUMENTS

| 5,907,660 A | 5/1999 | Inoue et al. |
| 6,434,319 B1 | 8/2002 | Wine |

(Continued)

OTHER PUBLICATIONS

Benjamin Bross et al, "High Efficiency Video Coding (HEVC) Text Specification Draft 9", JCTVC-K1003_v6, Joint Collaborative Team on Video Coding (JCT-VC) of ITU-T SG16 WP3 and ISO/IEC JTC1/SC29/WG11, Oct. 10-19, 2012, Shanghai, China (290 pages).
(Continued)

*Primary Examiner* — Zaihan Jiang
(74) *Attorney, Agent, or Firm* — Carl G. Peterson; Frank D Cimino

(57) ABSTRACT

A method is provided that includes receiving pictures of a video sequence in a video encoder, and encoding the pictures to generate a compressed video bit stream that is transmitted to a video decoder in real-time, wherein encoding the pictures includes selecting a picture to be encoded as a delayed duplicate intra-predicted picture (DDI), wherein the picture would otherwise be encoded as an inter-predicted picture (P-picture), encoding the picture as an intra-predicted picture (I-picture) to generate the DDI, wherein the I-picture is reconstructed and stored for use as a reference picture for a decoder refresh picture, transmitting the DDI to the video decoder in non-real time, selecting a subsequent picture to be encoded as the decoder refresh picture, and encoding the subsequent picture in the compressed bit stream as the decoder refresh picture, wherein the subsequent P-picture is encoded as a P-picture predicted using the reference picture.

13 Claims, 7 Drawing Sheets

Related U.S. Application Data continuation of application No. 13/671,344, filed on Nov. 7, 2012, now Pat. No. 9,906,815.

(60) Provisional application No. 61/557,190, filed on Nov. 8, 2011.

(51) Int. Cl.
*H04N 19/107* (2014.01)
*H04N 19/39* (2014.01)
*H04N 19/65* (2014.01)

(56) References Cited

U.S. PATENT DOCUMENTS

| | | | | |
|---|---|---|---|---|
| 6,529,555 | B1* | 3/2003 | Saunders | H04N 21/23406 375/E7.22 |
| 7,764,863 | B1* | 7/2010 | Strasman | H04N 21/47202 386/343 |
| 7,923,815 | B2 | 4/2011 | Wang et al. | |
| 2002/0144262 | A1* | 10/2002 | Plotnick | H04N 21/458 348/E7.071 |
| 2003/0039308 | A1 | 2/2003 | Wu et al. | |
| 2003/0039310 | A1* | 2/2003 | Wu | H04N 19/142 375/E7.181 |
| 2003/0156718 | A1 | 8/2003 | Candelore et al. | |
| 2004/0042548 | A1* | 3/2004 | Yu | H04N 19/177 375/240.03 |
| 2004/0056884 | A1* | 3/2004 | Eifrig | H04N 5/783 386/E5.052 |
| 2005/0207449 | A1* | 9/2005 | Zhang | H04N 21/482 375/E7.181 |
| 2005/0216395 | A1 | 9/2005 | Behmoiras et al. | |
| 2005/0231588 | A1* | 10/2005 | Yang | H04N 7/152 375/E7.199 |
| 2006/0190275 | A1 | 8/2006 | Dupree et al. | |
| 2007/0291837 | A1 | 12/2007 | Eleftheriadis | |
| 2008/0034396 | A1* | 2/2008 | Lev | H04N 7/17318 725/118 |
| 2008/0037656 | A1* | 2/2008 | Hannuksela | H04N 21/6377 375/240.26 |
| 2008/0144725 | A1* | 6/2008 | Henocq | H04N 19/89 375/E7.174 |
| 2008/0247463 | A1 | 10/2008 | Buttimer et al. | |
| 2008/0310630 | A1 | 12/2008 | Candelore | |
| 2009/0089678 | A1 | 4/2009 | Sacco et al. | |
| 2009/0110371 | A1* | 4/2009 | Akimoto | H04N 9/8042 386/344 |
| 2009/0304077 | A1* | 12/2009 | Wu | H04N 19/176 375/E7.243 |
| 2010/0135412 | A1* | 6/2010 | Wang | H04N 19/124 375/E7.123 |
| 2010/0153574 | A1* | 6/2010 | Lee | H04N 21/6377 709/231 |
| 2011/0305401 | A1* | 12/2011 | Lee | H04N 19/134 382/238 |
| 2011/0310217 | A1 | 12/2011 | Lee et al. | |
| 2012/0169923 | A1* | 7/2012 | Millar | H04N 19/174 348/399.1 |
| 2013/0013671 | A1* | 1/2013 | Relan | H04L 65/612 709/203 |

OTHER PUBLICATIONS

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, Mar. 16-23, 2011, Geneva, Switzerland (215 pages).

Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, Jul. 14-22, 2011, Torino, Italy (229 pages).

Benjamin Bross et al, "High Efficiency Video Coding (HEVC) Text Specification Draft 7", JCTVC-I1003_d1, Joint Collaborative Team on Video Coding (JCT-VC) of ITU-T SG16 WP3 and ISO/IEC JTC1/SC29/WG11, Apr. 27-May 7, 2012, Geneva, Switzerland (272 pages).

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, Jul. 11-20, 2012, Stockholm, Sweden (260 pages).

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, Nov. 21-30, 2011, Geneva, Switzerland (237 pages).

Ranga Ramanujam Srinivasan et al, "Delayed Duplicate I-Frame for Video Conferencing", JCTVC-G669, Joint Collaborative Team on Video Coding (JCT-VC) of ITU-T SG16 WP3 and ISO/IEC JTC1/SC29/WG11, Nov. 21-30, 2011, Geneva, Switzerland (5 pages).

Junghye Min et al, "Crosscheck of TI's JCTVC-G669 on Delay Dependent Intra Frame for Video Conferencing", JCTVC-G795, Joint Collaborative Team on Video Coding (JCT-VC) of ITU-T SG16 WP3 and ISO/IEC JTC1/SC29/WG11, Nov. 21-30, 2011, Geneva, Switzerland (2 pages).

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, Nov. 21-30, 2011, Geneva, Switzerland (259 pages).

\* cited by examiner

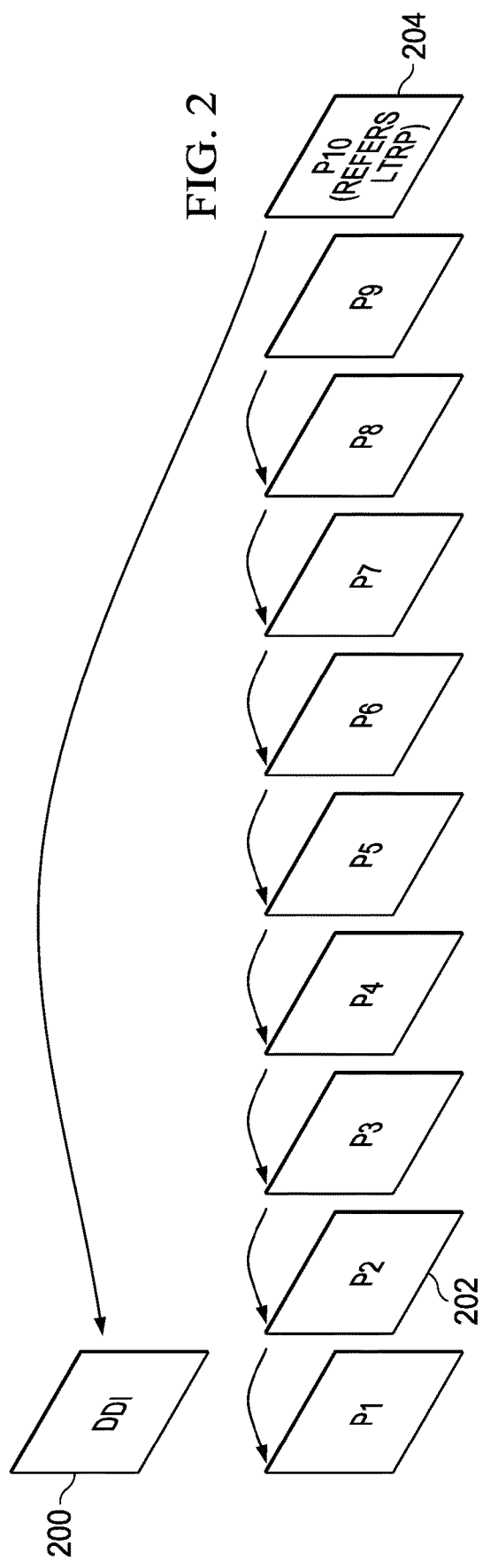
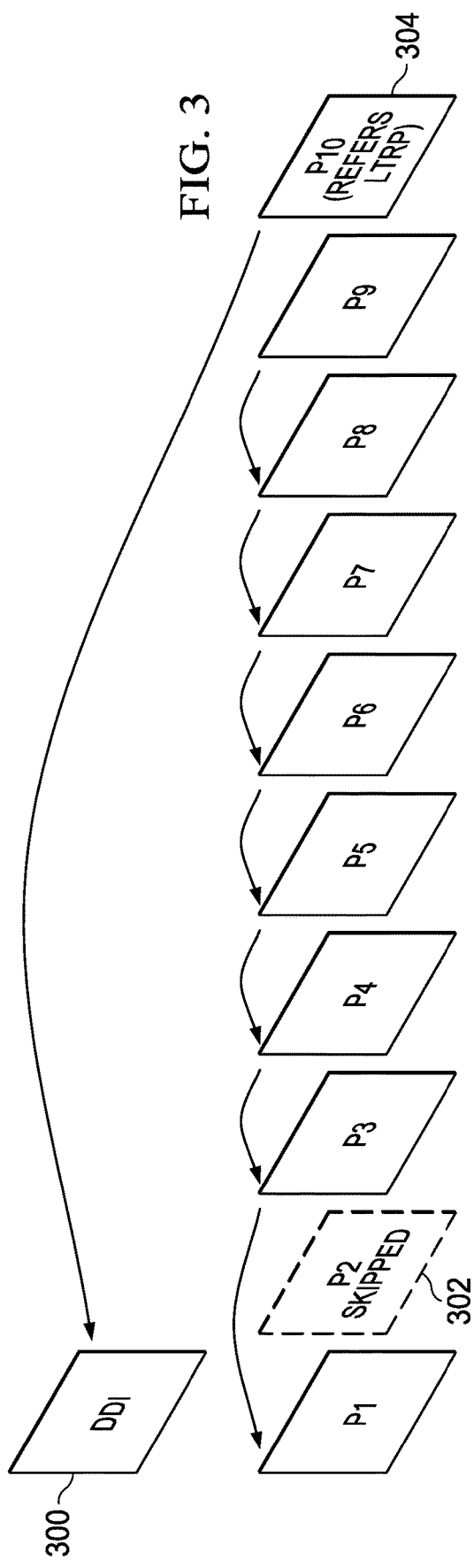

DELAYED DUPLICATE I-PICTURE FOR VIDEO CODING

CROSS-REFERENCE TO RELATED APPLICATIONS

This application is a continuation of U.S. patent application Ser. No. 15/905,588, filed Feb. 26, 2018, which is a continuation of U.S. patent application Ser. No. 13/671,344, filed Nov. 7, 2012, now U.S. Pat. No. 9,906,815, which claims the benefit of U.S. Provisional Patent Application Ser. No. 61/557,190 filed Nov. 8, 2011, all of which are incorporated herein by reference in their entirety.

BACKGROUND OF THE INVENTION

Field of the Invention

Embodiments of the present invention generally relate to use of delayed duplicate I-pictures in video coding.

Description of the Related Art

Many network-based video applications, e.g., video conferencing, online gaming, remote desktops, broadcasting, wireless displays, video signage, etc., send and/or receive video data with the expectation of near real-time communication and/or operate in bandwidth constrained environments. Further, such applications may rely on periodic transmission of an intra-predicted picture (I-picture) or an instantaneous decoder refresh (IDR). Such transmissions are used, for example, to keep any end-points refreshed, to stop error propagation due to network packet loss, to assist in recovery when there is packet loss and error concealment was not able to recover, or to negate the effect of a scene change. An I-picture is typically 7× the size of a predicted picture (P-picture).

For example, in many video conferencing applications, an intra-predicted picture (I-picture) or an instantaneous decoder refresh (IDR) is transmitted, at a minimum, once every five minutes (or every 9000 pictures). Some video conferencing systems operate with constrained and rigid network bandwidth availability, either because of leased-line restrictions or quality-of-service (QoS) restrictions within a company network. In such constrained network bandwidth conditions, the periodic IDR transmissions cause sudden spikes in network traffic, which may lead to packet loss and indirectly to bad video quality due to network congestion. FIG. 1 is a graph illustrating the IDR instantaneous bandwidth requirement for typical video sequences in a constant bit-rate control network environment. The sharp peaks in this graph correspond to the IDRs. Further, the large size of the IDRs may also cause increased end to end delay which may result in frame skipping by the decoder and lower quality display. Similar issues may occur in other video-based networked applications.

When there is packet loss, and when a concealment algorithm cannot recover the picture, there are various ways available to recover. One way is to send another IDR, which consumes more bandwidth in an already congested network. Another way is to send a P-picture which may refer to a long term reference picture (LTRP) that is error-free reconstructed on the decoder side. However, the LTRP may be distant in time from the current picture, which will lead to transmission of a larger P-picture. Another way is to send an IDR but reduce the encoded size. This may cause flicker in the display because of the reduced quality of the IDR as compared to the P-pictures.

There are two techniques commonly used to help reduce the IDR bandwidth requirement: adaptive intra refresh and gradual decoder refresh. In each of these techniques, differing sets of coding blocks of video data, e.g., macroblocks, are forced to be intra-predicted over a series of N P-pictures such that at the end of the N pictures, all coding blocks have been refreshed. This distribution of the intra refreshing over a group of P-pictures avoids the instantaneous bit rate peaks of IDR. However, in adaptive intra refresh, there is a possibility that refreshed coding blocks will refer to not yet refreshed coding blocks, leading to error propagation. In gradual decoder refresh, refreshed coding blocks are restricted from referring to non-refreshed coding blocks by restricting motion vectors and spatial prediction, which may cause increased bit-rate and lower video quality. Accordingly, other techniques to for decoder refresh are desirable.

SUMMARY

Embodiments of the present invention relate to methods, systems, and computer readable media for using delayed duplicate I-pictures in video coding. In one aspect, a method is provided that includes receiving pictures of a video sequence in a video encoder, and encoding the pictures in the video encoder to generate a compressed video bit stream that is transmitted to a video decoder in real-time, wherein encoding the pictures includes selecting a picture of the pictures to be encoded as a delayed duplicate intra-predicted picture (DDI), wherein the picture would otherwise be encoded as an inter-predicted picture (P-picture), encoding the picture as an intra-predicted picture (I-picture) to generate the DDI, wherein the I-picture is reconstructed and stored for use as a first reference picture for a decoder refresh picture, transmitting the DDI to the video decoder in non-real time, selecting a subsequent picture in the pictures to be encoded as the decoder refresh picture, and encoding the subsequent picture in the compressed bit stream as the decoder refresh picture, wherein the subsequent P-picture is encoded as a P-picture predicted using the first reference picture.

In one aspect, a method is provided that includes receiving a compressed video bit stream in a video decoder in real-time, and decoding the compressed video bit stream in the video decoder to reconstruct pictures of a video sequence, wherein decoding the compressed video bit stream includes receiving an encoded delayed duplicate intra-predicted picture (DDI) in non-real time, decoding the DDI, wherein the decoded picture is stored for use as a first reference picture for a decoder refresh picture encoded in the compressed bit stream, and wherein the decoded picture is not displayed, decoding the encoded decoder refresh picture from the compressed video bit stream, wherein the first reference picture is used to reconstruct the decoder refresh picture, and providing the decoded decoder refresh picture for display.

In one aspect, a system is provided that includes a video encoder and a first network interface operatively coupled to the video encoder. The video encoder includes means for receiving pictures of a video sequence, and means for encoding the pictures to generate a compressed video bit stream, wherein the means for encoding includes means for selecting a picture of the pictures to be encoded as a delayed duplicate intra-predicted picture (DDI), wherein the picture would otherwise be encoded as an inter-predicted picture (P-picture), means for encoding the picture as an intra-predicted picture (I-picture) to generate the DDI, wherein the I-picture is reconstructed and stored for use as a first reference picture for a decoder refresh picture, means for selecting a subsequent picture in the pictures to be encoded as the decoder refresh picture, and means for encoding the subsequent picture in the compressed bit stream as the decoder refresh picture, wherein the subsequent P-picture is encoded as a P-picture predicted using the first reference picture. The first network interface includes means for transmitting the compressed video bit stream to a video decoder in real-time, and means for transmitting the DDI to the video decoder in non-real time.

BRIEF DESCRIPTION OF THE DRAWINGS

Particular embodiments will now be described, by way of example only, and with reference to the accompanying drawings:

FIG. 2 is an example illustrating a delayed duplicate I-picture;

FIG. 3 is an example illustrating a delayed duplicate I-picture;

DETAILED DESCRIPTION OF EMBODIMENTS OF THE INVENTION

Figure 1:
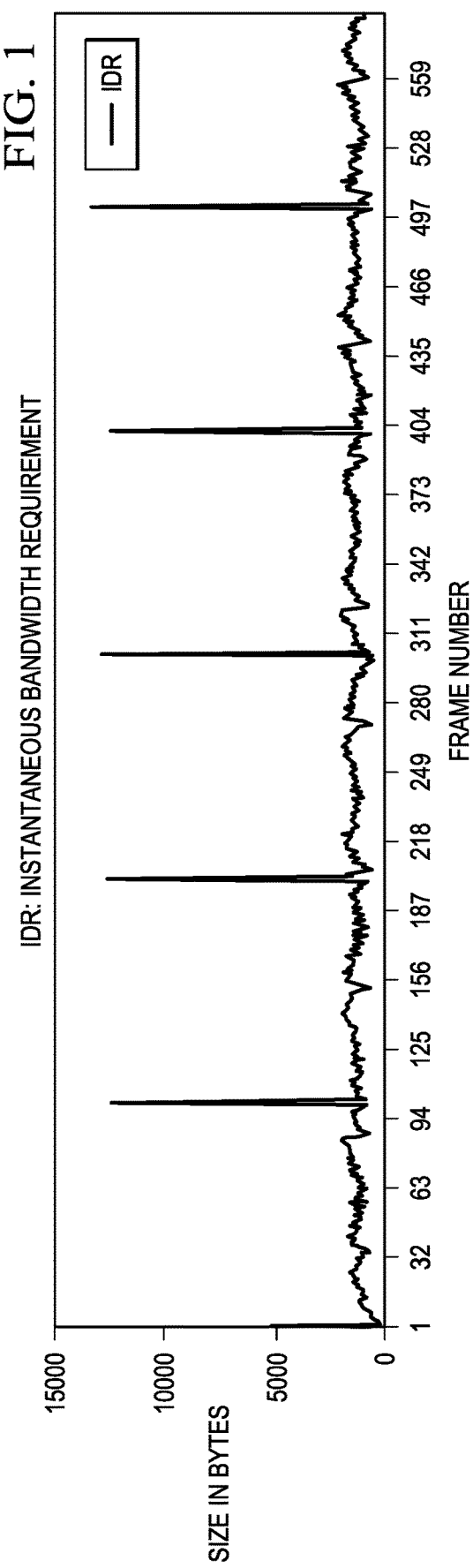
FIG. 1 is a graph illustrating the bandwidth requirement of instantaneous decoder refresh (IDR)

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval.

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). For convenience of description, some embodiments of the invention are described herein in reference to HEVC. One of ordinary skill in the art will understand that embodiments of the invention are not limited to HEVC encoders and decoders, but are applicable to video encoders and decoders for other video coding standards, e.g., H.264/AVC and MPEG-4.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, and 32×32. In some embodiments, non-square transforms may also be supported. The sizes of the transforms units and prediction units for a CU are determined by the video encoder during prediction based on minimization of rate/distortion costs.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), B. Bross, et al., "High Efficiency Video Coding (HEVC) Text Specification Draft 7," JCTVC-I1003_d0, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8") and B. Bross, et al., "High Efficiency Video Coding (HEVC) Text Specification Draft 9," JCTVC-K1003 v7, Joint Collaborative Team on Video Coding (JCT-VC) of ITU-T SG16 WP3 and ISO/IEC JTC1/SC29/WG1, Shanghai, CN, Oct. 10-19, 2012 ("HEVC Draft 9").

Some aspects of this disclosure have been presented to the JCT-VC in R. Srinivasan et al., "Delayed Duplicate I-Frame for Video Conferencing," JCTVC-G669, Joint Collaborative Team on Video Coding (JCT-VC) of ITU-T SG16 WP3 and ISO/IEC JTC1/SC29/WG11, Geneva, CH, Nov. 21-30, 2011, which is incorporated by reference herein in its entirety.

As was previously explained, decoder refresh via an I-picture or IDR is important for many network-based video applications but there are issues in using IDR or techniques meant to mitigate the bandwidth requirements of DR. Embodiments of the invention provide a way to substantially reduce the peak bandwidth and latency needed for accomplishing a decoder refresh. Rather than transmitting an I-picture in real-time for a decoder refresh or causing a refresh over some number of partially intra-predicted P-pictures, a delayed duplicate I-picture (DDI) is used that may be transmitted in non-real time. Given that a decoder refresh is to be performed every Z pictures, a picture occurring in the video stream at a specified time point (number of pictures) N prior to a Zth picture is encoded as an I-picture. The Zth pictures are referred to as decoder refresh pictures herein. The reconstructed I-picture is stored as a reference picture, e.g., as a long term reference picture (LTRP) or a short term reference picture (STRP), and the I-picture is transmitted in the background with a relaxed time constraint as compared to the compressed bit stream. Such I-pictures are referred to as DDIs herein.

The relaxed time constraint and the number of pictures between the DDI and the decoder refresh picture are interrelated. That is, the value of N is selected such that the DDI being transmitted in non-real time should be received and decoded by the decoder before the decoder begins decoding the decoder refresh picture. When a decoder refresh picture is encoded, it is encoded using the reference picture corresponding to the reconstructed DDI encoded N pictures earlier and is transmitted in real-time. On the decoder side, the decoder decodes the DDI and stores it as a reference picture, e.g., as an LTRP or a STRP, without displaying the DDI. Thus, when the decoder receives and decodes the decoder refresh picture, the DDI will be available to be used as the reference picture for the decoder refresh picture.

The picture that is selected for a DDI would typically be encoded as a P-picture. In some embodiments, the selected picture is encoded as the DDI and is also encoded as a P-picture that is transmitted in real-time. This is illustrated in the simple example of FIG. 2. In this example, N=8 and picture P10 is a decoder refresh picture. When picture P2 is received, it will be encoded as an I-picture, the reconstructed I-picture will be saved as a reference picture (an LTRP in this example), and the I-picture will be transmitted as a DDI. The picture P2 will also be encoded as a P-picture and transmitted in real-time. Thus, picture P3 may use picture P2 as a reference picture. When picture P10 is encoded, it will be encoded as a P-picture using the reconstructed DDI picture from P2 as the reference picture rather than using picture P9 as the reference picture. The encoded picture P10 will be transmitted in real-time. The pictures after P10 will not refer to any reference pictures preceding P10 except for the DDI picture.

Encoding a picture as both the DDI and a P-picture introduces the overhead of an additional encoding and decoding in the encoder and an additional decoding in the decoder. Accordingly, in some embodiments, the picture selected for a DDI is not also encoded as a P-picture and transmitted. Instead, encoding of this picture may be skipped, and the following picture encoded using the prior picture as the reference picture. Alternatively, the LCUs of the picture may be encoded using "skip" modes. The former case is illustrated in the simple example of FIG. 3. In this example, N=8 and picture P10 is a decoder refresh picture. When picture P2 is received, it will be encoded as an I-picture, the reconstructed I-picture will be saved as a reference picture (an LTRP in this example), and the I-picture will be transmitted as a DDI. However, the encoding of picture P2 as a P-picture will be skipped. Thus, picture P3 will be encoded as a P-picture using picture P1 as a reference picture. When picture P10 is encoded, it will be encoded as a P-picture using the reconstructed DDI picture from P2 as the reference picture rather than using picture P9 as the reference picture. The encoded picture P10 will be transmitted in real-time. The pictures after P10 will not refer to any reference pictures preceding P10 except for the DDI picture.

Figure 4:
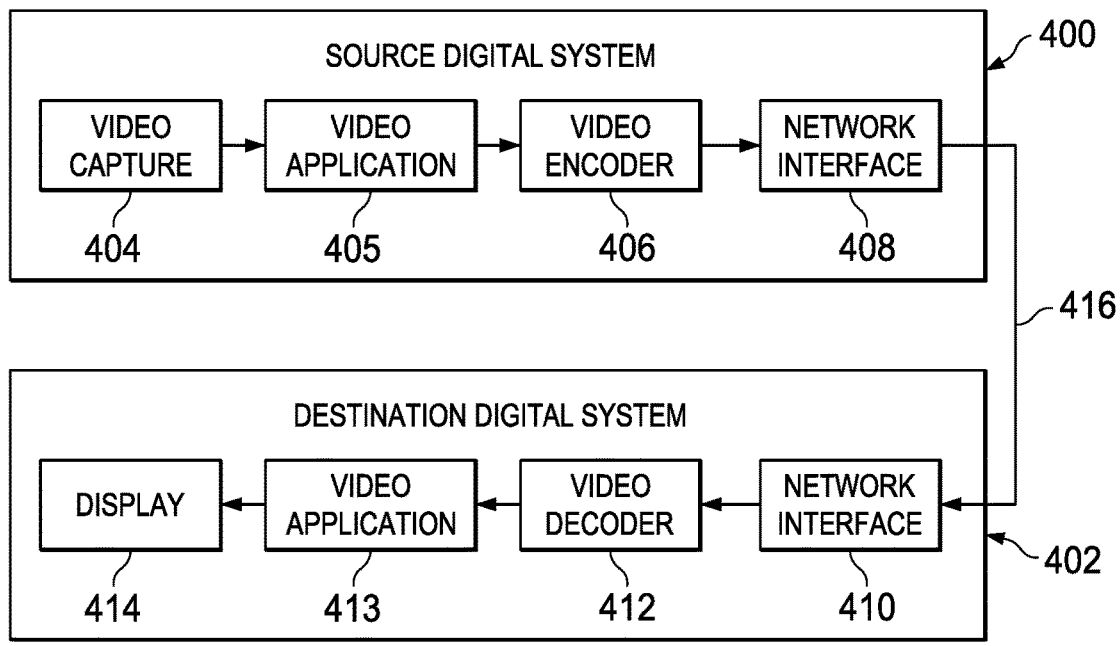
FIG. 4 is a block diagram of a digital system.

FIG. 4 shows a block diagram of a digital system that includes a source digital system 400 that transmits encoded video sequences to a destination digital system 402 via a communication channel 416. The source digital system 400 includes a video capture component 404, a video application 405, a video encoder component 406, and a network interface 408. The video capture component 404 is configured to provide a video sequence to the video application 405. The video capture component 404 may be, for example, a video camera, a video archive, or a video feed from a video content provider, e.g. an endpoint in a video conferencing system, a computing device being used in an online game, etc. In some embodiments, the video capture component 404 may generate computer graphics as the video sequence, or a combination of live video, archived video, and/or computer-generated video.

The video application 405 receives a video sequence from the video capture component 404 and performs any application specific processing needed in relation to the video sequence. For example, the video application 405 may display the video sequence locally or determine other data that is to be transmitted in conjunction with the video sequence. The video application 405 may also perform video pre-processing such as noise filtering. The video application 405 also passes the video sequence to the video encoder component 406 to be encoded for transmission to the destination digital system. The video application 405 may also specify to the video encoder component 406 how often a decoder refresh picture should be transmitted and how many pictures prior to the decoder refresh picture the transmission of the DDI should begin. Choosing the time frame for transmission of the DDI may include balancing the bandwidth effects of transmitting the DDI more quickly against the possible increase in size of the decoder refresh picture as the time period between the DDI and the decoder refresh picture is increased. Other considerations may be the latency requirement and the target bit rate, i.e., the lower the latency, the larger N will be. The video encoder component 406 may also configure the network interface component 408 to transmit the encoded video bit stream generated by the video encoder component 406 in real-time and to transmit each DDI generated by the video encoder component 406 in the background without real-time constraints.

The video encoder component 406 receives a video sequence from the video application 405 and encodes it for transmission by the network interface component 408. The video encoder component 406 receives the video sequence as a sequence of pictures, divides the pictures into largest coding units (LCUs), and encodes the video data in the LCUs. The video encoder component 406 is configured to generate DDIs and decoder refresh pictures during the encoding process as described herein. Further, the video encoder component 406 encodes the DDIs in a bit stream separate from the compressed video bit stream. An embodiment of the video encoder component 406 is described in more detail herein in reference to FIGS. 5A and 5B.

The network interface component 408 packetizes the compressed video bit stream and the DDI bit stream and transmits the packets to the destination digital system 402 via the communication channel 416. The network interface component 408 may implement any suitable network protocols that will meet the real time and non-real time requirements for transmitting, respectively, the compressed video bit stream and the DDI bit stream. For example, the network interface component 408 may be configured to use real-time transport protocol (RTP) for the transmission of the compressed video bit stream. To transmit the DDI bit stream, the network interface component 408 may, for example, divide a DDI bit stream in to multiple RTP packets and transmit these packets in an interleaved fashion with the RTP packets of the compressed video bit stream. Or, the network interface component 408 may divide a DDI bit stream into multiple parts and transmit each part as RTP packets, using real-time control protocol (RTCP) feedback packets to determine if the DDI is received. If the DDI is not received, the network interface component 408 may resend the DDI. Or, the network interface component 408 may use some other reliable protocol such as Transmission Control Protocol/Internet Protocol (TCP/IP) to transmit the DDI bit stream.

The communication channel 416 may be any communication medium, or combination of communication media suitable for transmission of the encoded data, such as, for example, wired or wireless communication media, a local area network, or a wide area network.

The destination digital system 402 includes a network interface component 410, a video decoder component 412, a video application 413, and a display component 414. The network interface component 410 receives the packets of the compressed video bit stream and packets of the DDI bit stream from the source digital system 400 via the communication channel 416. The network interface component 410 implements the same protocols used by the network interface component to depacketize the compressed video bit stream and the DDI bit stream, and provides both bit streams to the video decoder component 412 for decoding.

The video decoder component 412 reverses the encoding process performed by the video encoder component 406 to reconstruct the pictures of the video sequence from the compressed video bit stream and provides the reconstructed pictures to the video application 413. As part of the decoding process, the video decoder component 412 decodes the DDI bit stream and stores the decoded DDI as a reference frame for use as the reference frame when the corresponding decoder refresh picture is decoded. The decoded DDIs are not provided to the video application 413 or otherwise displayed. An embodiment of the video decoder component 412 is described in more detail below in reference to FIGS. 6A and 6B.

The video application 413 receives the decoded pictures from the video decoder component 412 and performs any application specific processing needed in relation to the video sequence. For example, the video application 413 may format the decoded pictures for display. In addition, the video application 413 may perform post-filtering to remove coding artifacts, edge enhancement, etc.

The reconstructed video sequence is displayed on the display component 414. The display component 414 may be any suitable display device such as, for example, a plasma display, a liquid crystal display (LCD), a light emitting diode (LED) display, etc.

In some embodiments, the source digital system 400 may also include a video decoder component and/or the destination digital system 402 may include a video encoder component for transmission of video sequences both directions for video steaming, video broadcasting, video telephony, video conferencing, etc. Further, the video encoder component 406 and the video decoder component 412 may perform encoding and decoding in accordance with one or more video compression standards. The video encoder component 406 and the video decoder component 412 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 5A:
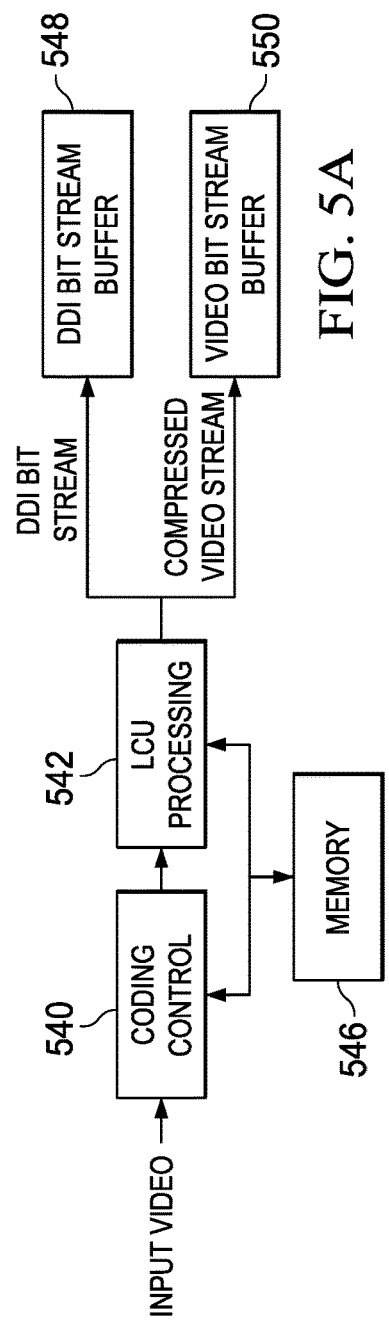
FIGS. 5A and 5B are block diagrams of a video encoder.
Figure 5B:
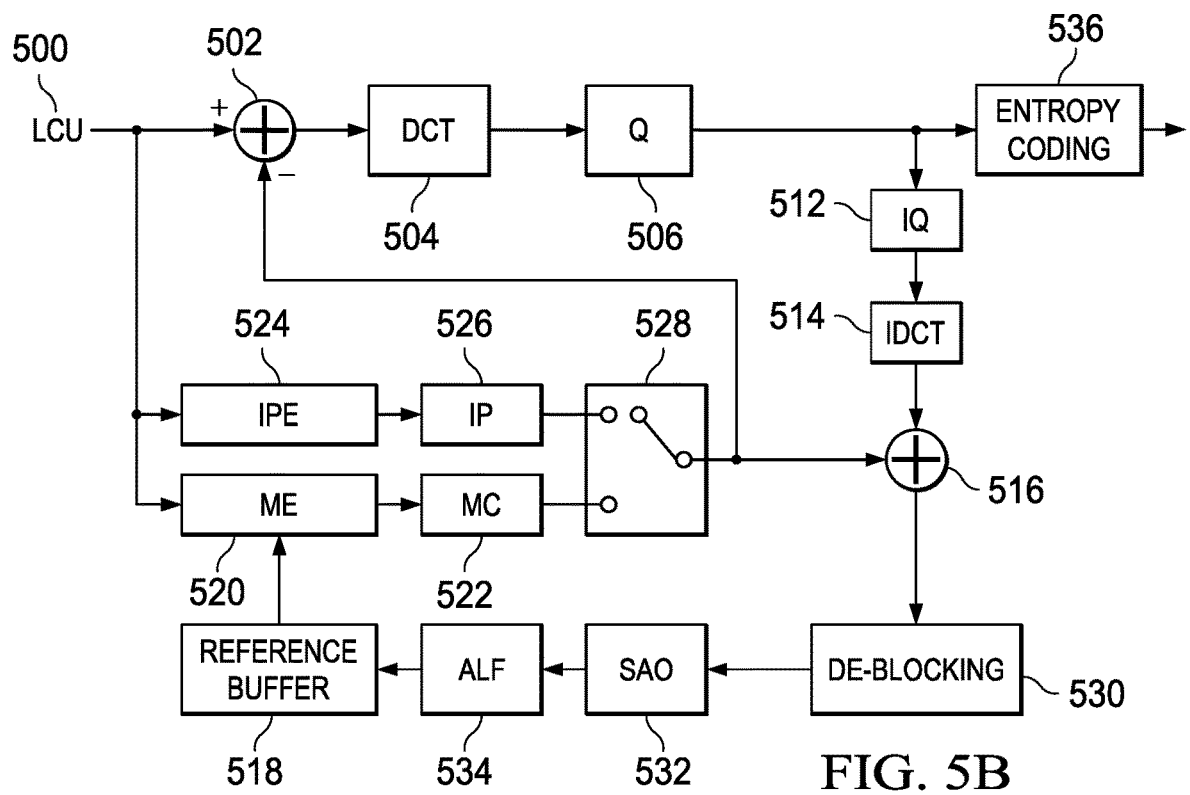

FIGS. 5A and 5B show block diagrams of an example video encoder, e.g., the video encoder component of FIG. 4, with functionality to encode DDIs and decoder refresh pictures. FIG. 5A shows a high level block diagram of the video encoder and FIG. 5B shows a block diagram of the LCU processing component 542 of the video encoder. As shown in FIG. 5A, the video encoder includes a coding control component 540, an LCU processing component 542, a memory 546, a DDI bit stream buffer 548, and a compressed video bit stream buffer 550. The memory 546 may be internal (on-chip) memory, external (off-chip) memory, or a combination thereof. The memory 546 may be used to communicate information between the various components of the video encoder. The DDI bit stream buffer 548 stores the bit streams for each DDI generated by the video encoder until the DDI is transmitted. The video bit stream buffer 550 stores the compressed video bit stream generated by the encoder while it awaits transmission. These buffers serve as interim storage between the video encoder and the network interface component 408 (see FIG. 4).

An input digital video sequence is provided to the coding control component 540, e.g., from a video application 405 (see FIG. 4). The coding control component 540 sequences the various operations of the video encoder, i.e., the coding control component 540 runs the main control loop for video encoding. For example, the coding control component 540 performs processing on the input video sequence that is to be done at the picture level, such as determining the coding type (I, P, or B) of a picture based on a high level coding structure, e.g., IPPP, IBBP, hierarchical-B, and dividing a picture into LCUs for further processing.

The coding control component 540 also manages the periodic generation of the DDIs and corresponding decoder refresh pictures. As was previously mentioned, a video application, e.g., the video application 405 of FIG. 4, may specify to the video encoder how often a decoder refresh picture should be transmitted in the compressed video bit stream. For example, the video application may specify that a decoder refresh picture should be transmitted every N pictures or every N seconds. In the latter case, the time may be converted to a picture count. The video application may also specify how many pictures (or seconds) prior to a decoder refresh picture the corresponding DDI should be generated.

The coding control component 540 may manage the periodic generation of the DDIs and corresponding decoder refresh pictures as follows. Until it is time to generate a DDI or a decoder refresh picture, the coding control component 540 may receive pictures in the input video sequence, divide each one into LCUs, and provide the LCUs to the LCU processing component 542, specifying to the LCU processing component 542 that each picture is to be encoded as a P-picture. Further, the coding control component may cause the output of the LCU processing component 542 to be directed to the video bit stream buffer 548.

When it is time to generate a DDI, the coding control component 540 causes a DDI to be generated with the next picture in the video sequence. More specifically, the coding control component 540 may specify to the LCU processing component 542 that the picture is to be encoded as an I-picture and may cause the output of the LCU processing component 542 to be directed to the DDI bit stream buffer 548 while the LCUs of the picture are encoded. As is described in more detail herein, the reconstructed I-picture is saved as a reference picture, e.g., an LTRP or STRP.

In some embodiments, the coding control component 540 may also include the picture in the compressed video bit stream. In such embodiments, the coding control component 540 causes the picture to be encoded again by the LCU processing component 542, this time as a P-picture. More specifically, the coding control component 540 may redirect the output of the LCU processing component 542 to the video stream buffer 550, and provide the LCUs of the picture to the LCU processing component 542 again, specifying that the picture is to be encoded as a P-picture.

In some embodiments, the coding control component 540 may not include the picture in the encoded video bit stream. In such embodiments, the coding control component 540 may resume encoding of the pictures in the video sequences as P-pictures with the next received picture, redirecting the output of the LCU processing component 542 to the video stream buffer 550.

In either embodiment, until it is time to generate the decoder refresh picture corresponding to the DDI, the coding control component 540 may receive pictures in the input video sequence, divide each one into LCUs, and provide the LCUs to the LCU processing component 542, specifying to the LCU processing component 542 that each picture is to be encoded as a P-picture. When it is time to generate the decoder refresh picture, the coding control component 540 may cause the next received picture to be encoded as a decoder refresh picture. That is, the coding control component 540 may specify to the LCU processing component that the picture is to be encoded as a P-picture using the DDI previously stored as a reference picture rather than the previous picture(s) in the video sequence. Once the decoder refresh picture is encoded, the coding control component 540 repeats the above described management process.

FIG. 5B shows a block diagram of the LCU processing component 542. The LCU processing receives LCUs 500 of the input video sequence from the coding control component 540 and encodes the LCUs 500 under the control of the coding control component 540 to generate the compressed video stream. The LCUs 500 in each picture are processed in row order. The LCUs 500 from the coding control component 540 are provided as one input of a motion estimation component (ME) 520, as one input of an intra-prediction estimation component (IPE) 524, and to a positive input of a combiner 502 (e.g., adder or subtractor or the like). Further, although not specifically shown, the prediction mode of each picture as selected by the coding control component 540 is provided to a mode decision component 528 and the entropy coding component 536.

The reference buffer component 518 provides reference data to the motion estimation component 520 and to the motion compensation component 522. The reference data may include one or more previously encoded and decoded pictures, i.e., reference pictures. The reference buffer component 518 stores one or more short term reference pictures (STRP) and long term reference pictures (LTRP).

The motion estimation component 520 provides motion data information to the motion compensation component 522 and the entropy coding component 536. More specifically, the motion estimation component 520 performs tests on CUs in an LCU based on multiple inter-prediction modes (e.g., skip mode, merge mode, and normal or direct inter-prediction), PU sizes, and TU sizes using reference picture data from the reference buffer component 518 to choose the best CU partitioning, PU/TU partitioning, inter-prediction modes, motion vectors, etc. based on coding cost, e.g., a rate distortion coding cost. The coding control component 540 may specify that a picture is to be encoded using a particular reference picture stored by the reference buffer component 518, in which case the specified reference picture is used. Note that this allows the coding control component 540 to direct that a DDI stored as a reference picture in the reference buffer component 518 is to be used to encode a pictured selected as the decoder refresh picture.

To perform the tests, the motion estimation component 520 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 520 provides the motion vector (MV) or vectors and the prediction mode for each PU in the selected CU partitioning to the motion compensation component (MC) 522.

The motion compensation component 522 receives the selected inter-prediction mode and mode-related information from the motion estimation component 520 and generates the inter-predicted CUs. The inter-predicted CUs are provided to the mode decision component 528 along with the selected inter-prediction modes for the inter-predicted PUs and corresponding TU sizes for the selected CU/PU/TU partitioning. The coding costs of the inter-predicted CUs are also provided to the mode decision component 528.

The intra-prediction estimation component 524 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra-prediction estimation component 524 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 524 provides the selected intra-prediction modes for the PUs, and the corresponding TU sizes for the selected CU partitioning to the intra-prediction component (IP) 526. The coding costs of the intra-predicted CUs are also provided to the intra-prediction component 526.

The intra-prediction component 526 (IP) receives intra-prediction information, e.g., the selected mode or modes for the PU(s), the PU size, etc., from the intra-prediction estimation component 524 and generates the intra-predicted CUs. The intra-predicted CUs are provided to the mode decision component 528 along with the selected intra-prediction modes for the intra-predicted PUs and corresponding TU sizes for the selected CU/PU/TU partitioning. The coding costs of the intra-predicted CUs are also provided to the mode decision component 528.

The mode decision component 528 selects between intra-prediction of a CU and inter-prediction of a CU based on the intra-prediction coding cost of the CU from the intra-prediction component 526, the inter-prediction coding cost of the CU from the motion compensation component 522, and the picture prediction mode provided by the coding control component 540. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 536.

The output of the mode decision component 528, i.e., the predicted PUs, is provided to a negative input of the combiner 502 and to the combiner 538. The associated transform unit size is also provided to the transform component 504. The combiner 502 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 504 performs block transforms on the residual CUs to convert the residual pixel values to transform coefficients and provides the transform coefficients to a quantize component 506. More specifically, the transform component 504 receives the transform unit sizes for the residual CU and applies transforms of the specified sizes to the CU to generate transform coefficients. Further, the quantize component 506 quantizes the transform coefficients based on quantization parameters (QPs) and quantization matrices provided by the coding control component 540 and the transform sizes and provides the quantized transform coefficients to the entropy coding component 536 for coding in the bit stream.

The entropy coding component 536 entropy encodes the relevant data, i.e., syntax elements, output by the various encoding components and the coding control component 540 to generate the compressed video bit stream. Among the syntax elements that are encoded are picture parameter sets, flags indicating the CU/PU/TU partitioning of an LCU, the prediction modes for the CUs, and the quantized transform coefficients for the CUs. The entropy coding component 536 also codes relevant data such as ALF parameters, e.g., filter type, on/off flags, and filter coefficients, and SAO parameters, e.g., filter type, on/off flags, and offsets.

The LCU processing component 542 includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 512, which outputs a reconstructed version of the transform result from the transform component 504. The dequantized transform coefficients are provided to the inverse transform component (IDCT) 514, which outputs estimated residual information representing a reconstructed version of a residual CU. The inverse transform component 514 receives the transform unit size used to generate the transform coefficients and applies inverse transform(s) of the specified size to the transform coefficients to reconstruct the residual values. The reconstructed residual CU is provided to the combiner 538.

The combiner 538 adds the original predicted CU to the residual CU to generate a reconstructed CU, which becomes part of reconstructed picture data. The reconstructed picture data is stored in a buffer (not shown) for use by the intra-prediction estimation component 524.

Various in-loop filters may be applied to the reconstructed picture data to improve the quality of the reference picture data used for encoding/decoding of subsequent pictures. The in-loop filters may include a deblocking filter 530, a sample adaptive offset filter (SAO) 532, and an adaptive loop filter (ALF) 534. In some embodiments, the ALF 534 may not be present. The various in-loop filters may be applied on an LCU-by-LCU basis. The in-loop 530, 532, 534 are applied to each reconstructed LCU in the picture and the final filtered reference picture data is provided to the reference buffer component 518. The reference picture may be stored as an LTRP or an STRP. Note that when the DDI is encoded, a reference picture corresponding to the DDI is automatically stored in the reference buffer component 518.

Figure 6A:
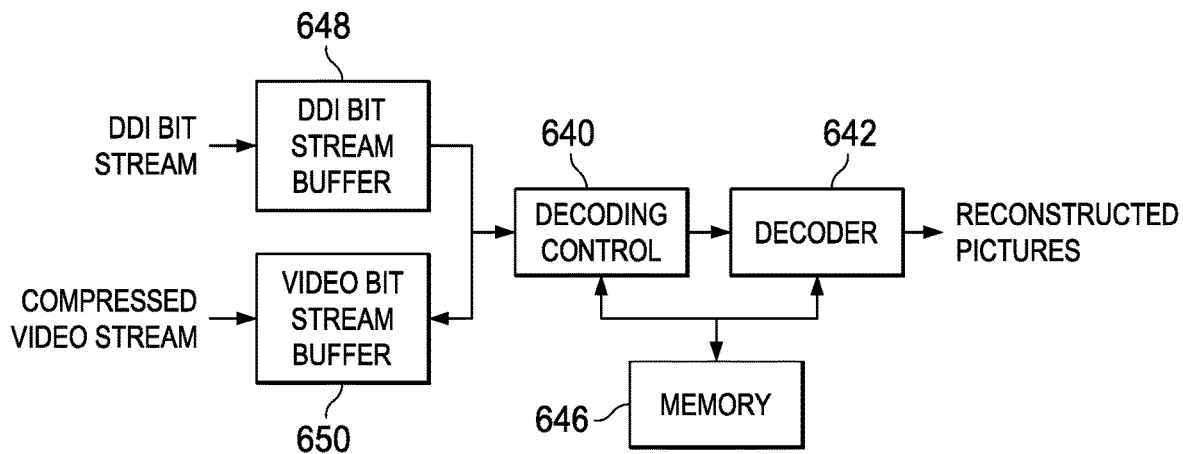
FIGS. 6A and 6B are block diagrams of a video decoder.
Figure 6B:
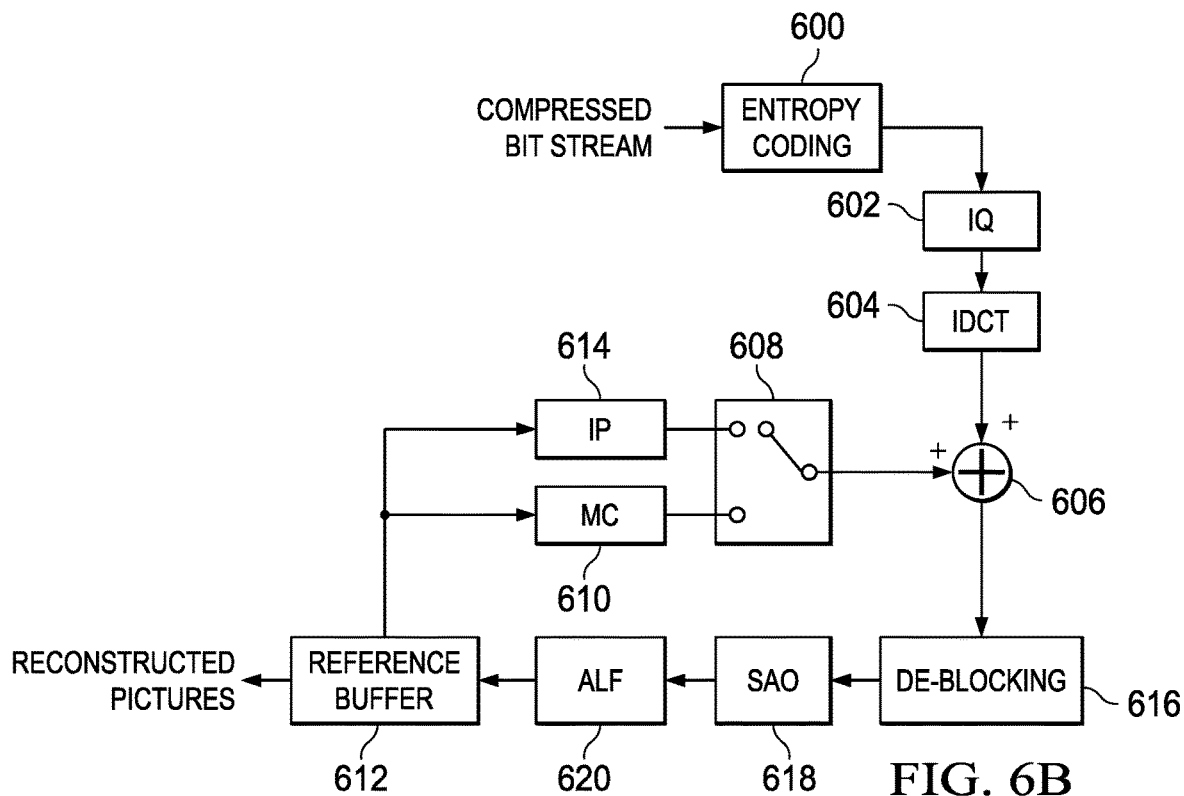

FIGS. 6A and 6B show block diagrams of an example video decoder, e.g., the video decoder component of FIG. 4, with functionality to decode DDIs and decoder refresh pictures. FIG. 6A shows a high level block diagram of the video decoder and FIG. 6B shows a block diagram of the decoding component 642 of the video decoder. In general, the video decoder operates to reverse the encoding operations, i.e., entropy coding, quantization, transformation, and prediction, performed by the video encoder of FIGS. 5A and 5B to regenerate the pictures of the original video sequence. In view of the above description of a video encoder, one of ordinary skill in the art will understand the functionality of components of the video decoder without need for detailed explanation.

Referring now to FIG. 6A, the video decoder includes a decoding control component 640, a decoding component 642, a memory 646, a DDI bit stream buffer 648, and a compressed video bit stream buffer 650. The memory 646 may be internal (on-chip) memory, external (off-chip) memory, or a combination thereof. The memory 646 may be used to communicate information between the various components of the video decoder. The DDI bit stream buffer 548 and the video bit stream buffers serve as interim storage between the video decoder and the network interface component 410 (see FIG. 4). That is, as the network interface component receives packets containing portions of a DDI bit stream, the network interface component recovers the portions of the DDI bit stream from the packets and stores them in the DDI bit stream buffer 548. Similarly, as the network interface component receives packets containing portions of the compressed video bit stream, the network interface recovers portions of the compressed video bit stream from the packets and stores them in the video bit stream buffer 550.

The decoding control component 640 controls the input to the decoding component 642, switching between providing the compressed video bit stream in the video bit stream buffer 650 for decoding and providing the DDI bit stream in the DDI bit stream buffer 648 for decoding. The decoding control component 640 provides the content of the video bit stream buffer 650 to the decoding component 642 until a complete DDI bit stream is received in the DDI bit stream buffer 648 The network interface component may notify the decoding control component 640 in some suitable way when a complete DDI bit stream has been received. The decoding control component 640 may then begin providing the content of the DDI bit stream buffer 650 to the decoding component 642 to decode the I-picture at an appropriate point in time. The decoding control component 642 may also block sending of the reconstructed picture corresponding to the DDI to the video application 413 (see FIG. 4). When the DDI bit stream buffer 650 is empty, the decoding control component 640 resumes providing the compressed bit stream in the video bit stream buffer 650 to the decoding component 642 until another complete DDI bit stream is received.

FIG. 6B shows a block diagram of the decoding component 642. The decoding component receives a compressed bit stream from the decoding control component 640 and decodes the encoded pictures. The entropy decoding component 600 receives the entropy encoded (compressed) video bit stream and reverses the entropy coding to recover the encoded syntax elements, e.g., CU, PU, and TU structures of LCUs, quantized transform coefficients, motion vectors, prediction modes, etc. The decoded syntax elements are passed to the various components of the decoding component 642 as needed. For example, decoded prediction modes are provided to the intra-prediction component (IP) 614 or motion compensation component (MC) 610. If the decoded prediction mode is an inter-prediction mode, the entropy decoder 600 reconstructs the motion vector(s) as needed and provides the motion vector(s) to the motion compensation component 610.

The inverse quantize component (IQ) 602 de-quantizes the quantized transform coefficients of the CUs. The inverse transform component 604 transforms the frequency domain data from the inverse quantize component 602 back to the residual CUs. That is, the inverse transform component 604 applies an inverse unit transform, i.e., the inverse of the unit transform used for encoding, to the de-quantized residual coefficients to produce reconstructed residual values of the CUs.

A residual CU supplies one input of the addition component 606. The other input of the addition component 606 comes from the mode switch 608. When an inter-prediction mode is signaled in the encoded video stream, the mode switch 608 selects predicted PUs from the motion compensation component 610 and when an intra-prediction mode is signaled, the mode switch selects predicted PUs from the intra-prediction component 614.

The motion compensation component 610 receives reference data from the reference buffer component 612 and applies the motion compensation computed by the encoder and transmitted in the encoded video bit stream to the reference data to generate a predicted PU. That is, the motion compensation component 610 uses the motion vector(s) from the entropy decoder 600 and the reference data to generate a predicted PU. When the current picture was encoded using a specified reference picture, the reference picture data is from the specified reference picture stored by the reference buffer component 612. Note that by the time a picture that was selected as a decoder refresh picture by the encoder is decoded, the needed reference picture from the corresponding DDI will be stored in the reference buffer component 612.

The intra-prediction component 614 receives reconstructed samples from previously reconstructed PUs of a current picture from the reference buffer component 612 and performs the intra-prediction computed by the encoder as signaled by an intra-prediction mode transmitted in the encoded video bit stream using the reconstructed samples as needed to generate a predicted PU.

The addition component 606 generates a reconstructed CU by adding the predicted PUs selected by the mode switch 608 and the residual CU. The output of the addition component 606, i.e., the reconstructed CUs, is stored in the reference buffer component 612 for use by the intra-prediction component 614.

In-loop filters may be applied to reconstructed coded picture data to improve the quality of the decoded pictures and the quality of the reference picture data used for decoding of subsequent pictures. The in-loop filters are the same as those of the encoder, i.e., a deblocking filter 616, a sample adaptive offset filter (SAO) 618, and an adaptive loop filter (ALF) 620. In some embodiments, the ALF 620 may not be present. The in-loop filters may be applied on an LCU-by-LCU basis. That is, the in-loop filters 616, 618, 620 are applied to each reconstructed LCU in the picture and the final filtered reference picture data is stored in the reference buffer component 612. The reference picture may be stored as an LTRP or an STRP. Note that when the DDI is decoded, a reference picture corresponding to the DDI is stored in the reference buffer component 518.

Figure 7:
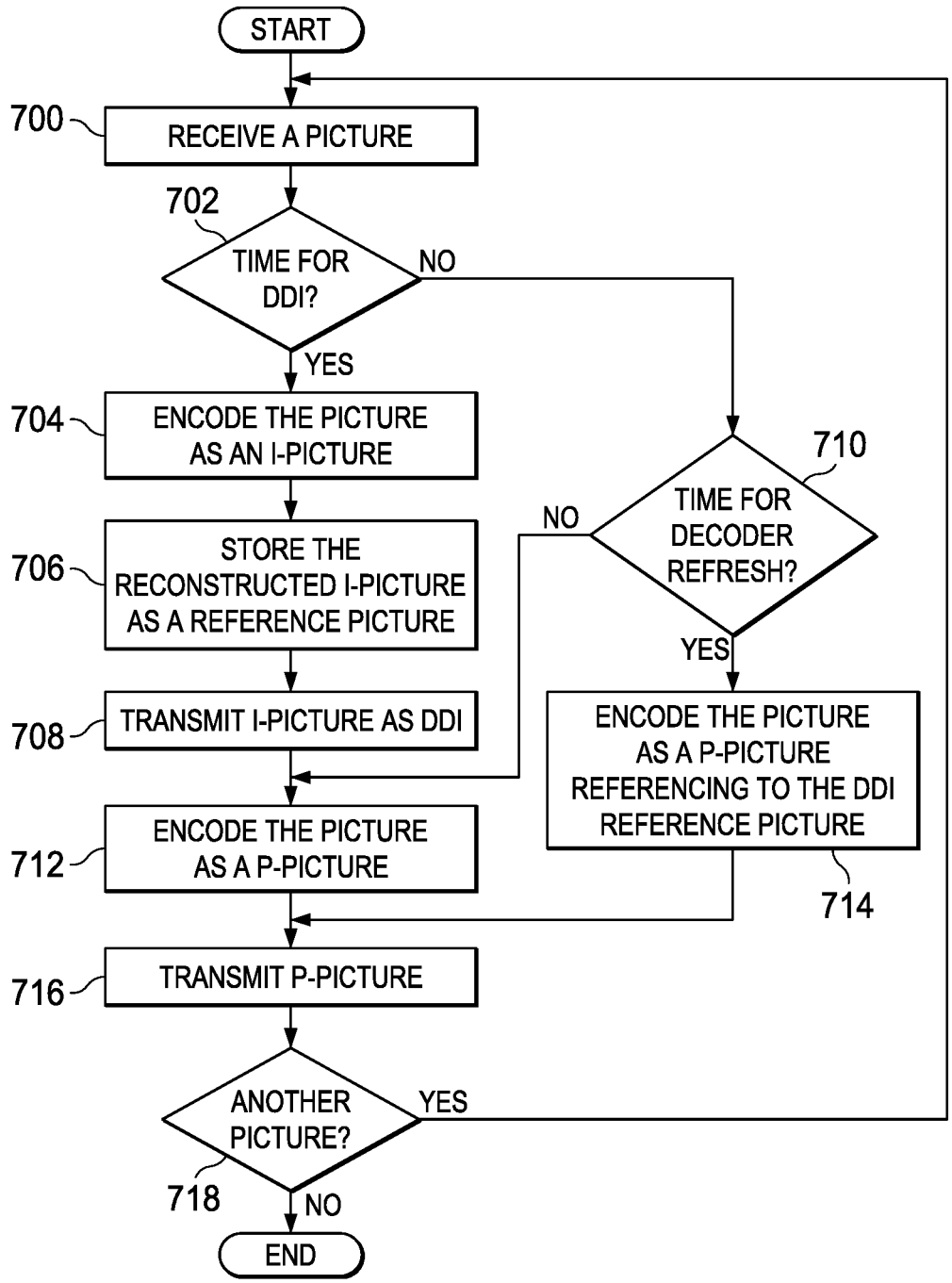
FIGS. 7 and 8 are flow diagrams of methods.

FIG. 7 is a flow diagram of a method for using delayed duplicate I-pictures (DDIs) and decoder refresh pictures in the encoding and transmission of a video sequence. This method may be used, for example, in the digital system of FIG. 4. Initially, a picture from the video sequence is received, e.g., from the video capture component 404 via the video application 405. If it is time to send a DDI 702, then the picture is encoded 704 as an I-picture, the reconstructed I-picture is stored 706 as a reference picture, and the I-picture is transmitted 708 as a DDI, i.e., is transmitted with non-real time constraints. The picture is also encoded 712 as a P-picture and transmitted 716 as part of the compressed video bit stream. The processing then continues with the next picture 700, if any 718.

If it is not time to send a DDI 702, then a check is made to determine 710 if it is time to send a decoder refresh picture. If it is time to send a decoder refresh picture, then the picture is encoded 714 as a P-picture referencing the DDI reference picture stored at step 706 (the reconstructed DDI corresponding to the decoder refresh picture). This P-picture is then transmitted 716 as part of the compressed video bit stream and the processing continues with the next picture 700, if any 718. If it is not time to send a decoder refresh picture 710, the picture is encoded 712 as a P-picture referencing the previously encoded picture and transmitted 716 as part of the compressed video bit stream. The processing then continues with the next picture 700, if any 718.

In some embodiments, the picture selected to be encoded as the DDI is not also encoded as a P-picture. In such embodiments, after step 708, step 718 is performed.

Figure 8:
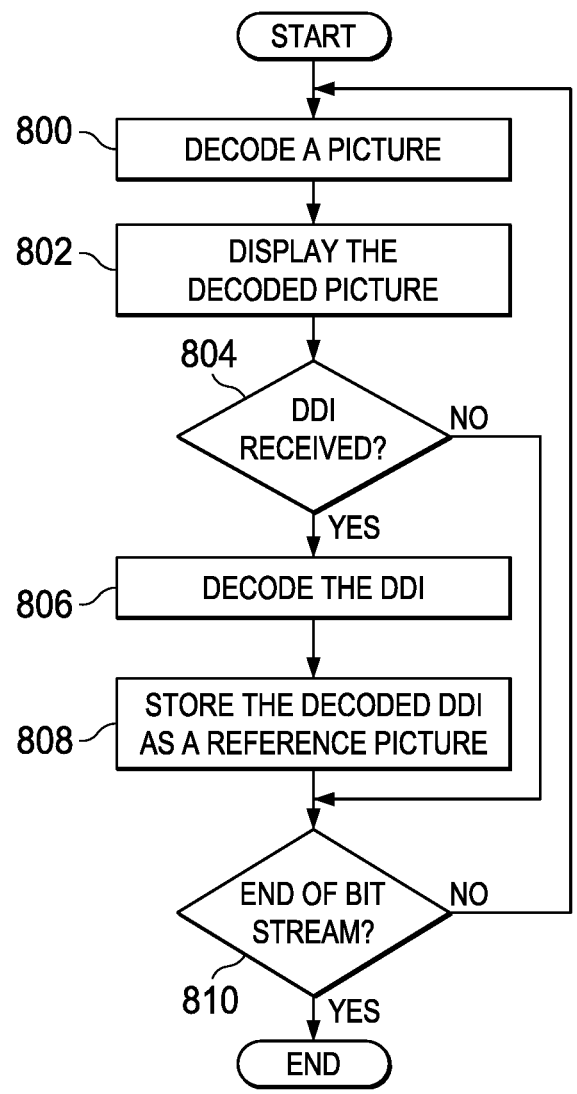

FIG. 8 is a flow diagram for a method for using DDIs and decoder refresh pictures in the receipt and decoding of a compressed video bit stream. This method may be used, for example, in the digital system of FIG. 4. Initially a picture is decoded 800 from the compressed video bit stream and the decoded picture is displayed 802, e.g., by providing the decoded picture to the video application 412. If a DDI has not been received 804, the processing of the compressed bit stream then continues 800 unless the end of the compressed bit stream has been reached 810. If a DDI has been received 804, then the DDI is decoded 806 and stored as a reference picture 808. Accordingly, the next P-picture decoded from the compressed video bit stream that references this stored reference picture will use the decoded DDI as the reference picture. The processing of the compressed bit stream then continues 800 unless the end of the compressed bit stream has been reached 810.

Figure 9:
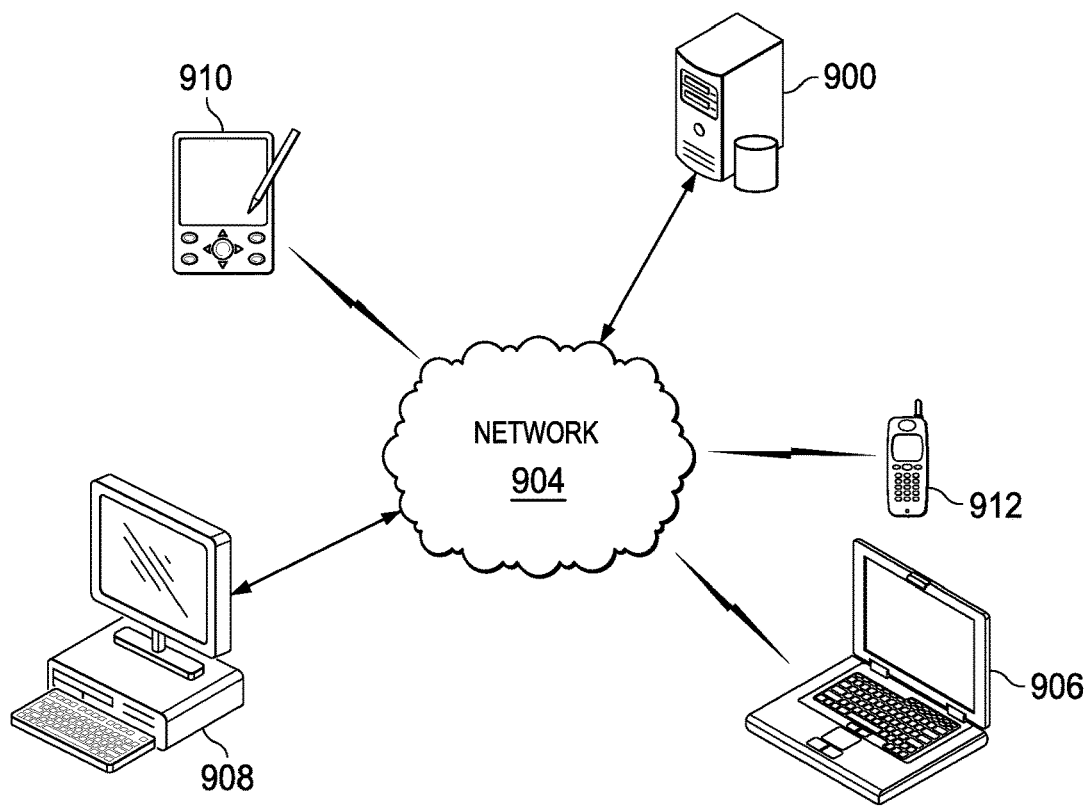
FIG. 9 is a diagram of a networked system using delayed duplicate I-pictures.

FIG. 9 is a diagram of a network-based video application system, e.g., a video conferencing system. The system includes a video conference server 900, and various computing devices 606-912 coupled to the application server 900 via a network. 904 to participate in a video conference. The network 904 may be any suitable communication medium, or combination of communication media, such as, for example, wired or wireless communication media, a local area network, and/or a wide area network. Four computing devices are shown for example purposes. More or fewer computing devices may be present. The computing devices may be, for example, a tablet device 910, a desktop computer 908, a laptop computer 906, or a smart phone 912. A computing device may be configured as described in FIG. 10. The video conference server 900 includes functionality to manage the video aspects of the video conference, receiving compressed video bit streams from each of the connected computing devices 906-912 as needed during a video conference session and routing the bit streams to the other computing devices as needed. Each of the connected computing devices 906-912 hosts a video conference application and may encode and transmit compressed video bit streams with DDIs and decoder refresh pictures at appropriate intervals as described herein and may decode compressed video bit streams encoded using DDIs and decoder refresh pictures as describe herein.

Figure 10:
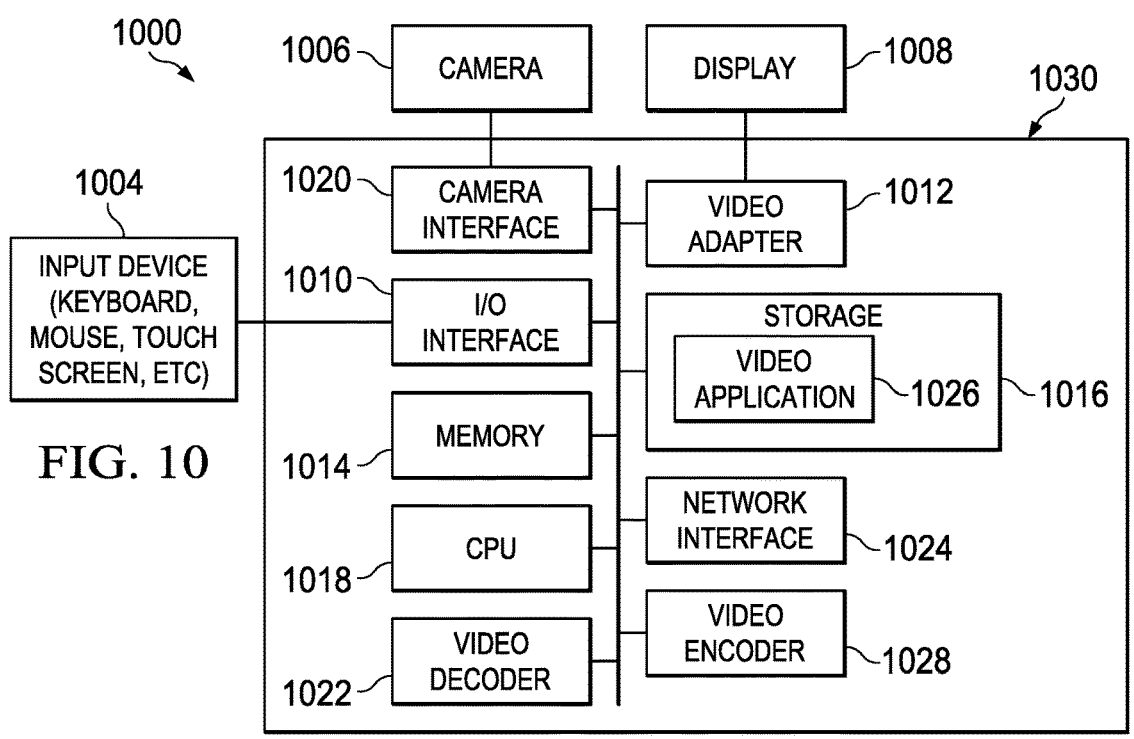
FIG. 10 is a block diagram of a digital system.

FIG. 10 is a block diagram of a computing device 1000 that may be used in the system of FIG. 9. The computing device 1000 includes a processing unit 1030 equipped with one or more input devices 1004 (e.g., a mouse, a keyboard, or the like), and one or more output devices, such as a display 1008, or the like. In some embodiments, the display 1008 may be touch screen, thus allowing the display 1008 to also function as an input device. The processing unit 1030 may be, for example, a desktop computer, a workstation, a laptop computer, a tablet computer, a smart phone, etc. The display may be any suitable visual display unit such as, for example, a computer monitor, an LED, LCD, or plasma display, a television, a high definition television, or a combination thereof.

The processing unit 1030 includes a central processing unit (CPU) 1018, memory 1014, a storage device 1016 storing a video application 1026, a video adapter 1012, an I/O interface 1010, a video decoder 1022, a video encoder 1028, a camera 1006, a camera interface 1010, and a network interface 1024 connected to a bus. The bus may be one or more of any type of several bus architectures including a memory bus or memory controller, a peripheral bus, a video bus, or the like.

The CPU 1018 may be any type of electronic data processor. For example, the CPU 1018 may be a processor from Intel Corp., a processor from Advanced Micro Devices, Inc., a Reduced Instruction Set Computer (RISC), an Application-Specific Integrated Circuit (ASIC), or the like. The memory 1014 may be any type of system memory such as static random access memory (SRAM), dynamic random access memory (DRAM), synchronous DRAM (SDRAM), read-only memory (ROM), flash memory, a combination thereof, or the like. Further, the memory 1014 may include ROM for use at boot-up, and DRAM for data storage for use while executing programs.

The storage device 1016 (e.g., a computer readable medium) may include any type of storage device configured to store data, programs, and other information and to make the data, programs, and other information accessible via the bus. In one or more embodiments, the storage device 1016 stores software instructions that, when executed by the CPU 1018, cause the processing unit 1030 to execute the video application 1026. The video application 1026 may be a video conferencing application that allows the computing device to be used for video conferencing in a video conferencing system such as that of FIG. 9. The storage device 1016 may be, for example, one or more of a hard disk drive, a magnetic disk drive, an optical disk drive, or the like. The storage device 1016 may also store any software instructions needed for the operation of other system components, such as, for example, the video decoder 1022, the video encoder 1028, and the network interface 1024.

The video adapter 1012 and the I/O interface 1010 provide interfaces to couple external input and output devices to the processing unit 1030. As illustrated in FIG. 10, examples of input and output devices include the display 1008 coupled to the video adapter 1012 and the mouse/keyboard 1004 coupled to the I/O interface 1010. The camera interface 1010 provides an interface to the camera 1006. Pictures captured by the camera 1006 may be directed to the video application 1026.

The network interface 1024 allows the processing unit 1030 to communicate with remote units, e.g., the server 900 or other computing devices of FIG. 9, via a network, e.g., the network 902 of FIG. 9. The network interface 1024 may provide an interface for a wired link, such as an Ethernet cable or the like, and/or a wireless link via, for example, a local area network (LAN), a wide area network (WAN) such as the Internet, a cellular network, any other similar type of network and/or any combination thereof.

The computing device 1010 may also include other components not specifically shown. For example, the computing device 1010 may include power supplies, cables, a motherboard, removable storage media, cases, and the like.

The video decoder component 1022 decodes pictures in a compressed video bit stream received from the video application 1026 via the network interface 1024. The decoded pictures may be provided by the video application 1026 to the video adapter 1012 for display on the display 1008. The video decoder component 1022 may be an embodiment of the video decoder of FIGS. 6A and 6B.

The video encoder component 1028 encodes pictures captured by the camera 1006 and directed to the video encoder component 1028 by the video application 1026. The video encoder component 1028 may be an embodiment of the video encoder of FIGS. 5A and 5B.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described in which the use of DDIs not included in a video coding standard implemented by the video encoder and decoder. In some embodiments, the video coding standard may directly support DDIs. For example, in some embodiments, HEVC may be extended to include a new slice type and an additional flag may be added to the existing slice header to allow DDIs to be implemented directly by a conforming encoder and decoder. More specifically, the new slice type D-Slice may be defined specifically for DDI-pictures. Such a slice type may have the same characteristics as an FIDR-picture except that it is transmitted in non-real time and is referred to by a distant P-picture, i.e., a decoder refresh picture. The additional flag in a slice header may be used to indicate that a slice refers to a DDI-picture. This flag would be set for a P-picture referring got the DDI-picture and would not be set for other pictures.

In another example, some video coding standards, e.g., H.264/AVC, include support for reference buffer commands that may sent in the encoded bit stream and used to manage the content of the reference picture buffer at the beginning of each slice. Such commands may be used to guarantee the retention of the DDI reference picture in the reference buffer. One of ordinary skill in the art, having benefit of this disclosure, will understand embodiments in which reference buffer commands are used.

In another example, embodiments have been described herein in which a video encoder encodes the picture selected as a DDI in a serial fashion, i.e., the entire picture is encoded as a DDI and then encoded as a P-picture before the next picture is encoded. In some embodiments, the encoder may encode the picture as a P-frame and as a DDI in one frame encoding time period. In some embodiments, the encoder may first encode the picture as a P-picture and then encode 1/N of the same picture as a DDI over the next N pictures, where N is the time period from the DDI picture to the decoder refresh picture.

In another example, embodiments have been described herein in which a video decoder decodes from a compressed bit stream and a DDI bit stream in a serial fashion. In some embodiments, the video decoder may decode the DDI bit stream interleaved with decoding the compressed video bit stream. For example, after decoding the current picture from video bit stream buffer, the decoding control component 640 may check whether the DDI bit stream buffer 648 is empty. If not, the decoding control component 640 may then begin providing the content of the DDI bit stream buffer 648 to the decoding component 642 to decode portion of DDI bit stream, e.g., to reconstruct a 1/N portion of the DDI picture. Subsequently, the decoding control component 640 may resume providing the compressed bit stream in the video bit stream buffer 650 to the decoding component 642 to decode the next picture. After decoding the next picture, the decoding control component 640 may switch to the DDI bit stream buffer 648 to provide the DDI bit stream to the decoding component 642 for decoding the next 1/N portion of the DDI picture. The decoding control component 640 may repeat this process until the entire DDI picture is decoded.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method comprising:
   receiving, by a video encoder, a set of pictures;
   encoding, by the video encoder, a first picture of the set of pictures in a compressed bit stream as a first encoded picture having a first picture type;
   reconstructing, by the video encoder, the first encoded picture to generate a reconstructed picture;
   encoding, by the video encoder, a second picture of the set of pictures in the compressed bit stream as a second encoded picture, wherein the second picture is encoded based on the reconstructed picture as a second picture type, and wherein the second picture type is different than the first picture type;
   transmitting, by the video encoder, the first encoded picture at a first rate; and
   transmitting, by the video encoder, the second encoded picture at a second rate, wherein the first rate is different from the second rate and the second rate is based on a number of pictures between the second encoded picture and a refresh picture.

2. The method of claim 1, further comprising:
   encoding, by the encoder, the first picture as a P-picture in the compressed bit stream.

3. The method of claim 1, further comprising:
   receiving the compressed bit stream in a video decoder; and
   decoding the compressed bit stream in the video decoder to reconstruct the set of pictures, wherein decoding the compressed bit stream comprises:
      decoding the first encoded picture to generate a decoded first picture, wherein the decoded first picture is stored for use as a reference picture for decoding the second encoded picture and wherein the decoded first picture is not displayed;
      decoding the second encoded picture from the compressed bit stream to generate a decoded second picture, wherein the decoded first picture is used to decode the second picture; and
      providing the decoded second picture for display.

4. The method of claim 1, wherein the second encoded picture is transmitted separately from the compressed bit stream.

5. The method of claim 4, wherein the second encoded picture is transmitted according to a first network protocol and the compressed bit stream is transmitted according to a second network protocol.

6. The method of claim 5, wherein the first network protocol and the second network protocol are a same network protocol.

7. The method of claim 1, wherein the video encoder and a video decoder are comprised in a video conferencing system.

8. The method of claim 1,
   wherein the second picture is selected as a number Z pictures after the first picture in the set of pictures.

9. The method of claim 1, further comprising:
   transmitting the first encoded picture to a video decoder in real time;
   transmitting the second encoded picture to the video decoder as a delayed transmission in non-real time;
   decoding, by the video decoder, the first encoded picture to generate a decoded first picture;
   decoding, by the video decoder, the second encoded picture using the decoded first picture;
   wherein the second picture is selected so that the first encoded picture will be received and decoded by the decoder before the video decoder begins decoding the refresh picture.

10. A system comprising:
   a video encoder; and
   a network interface operatively coupled to the video encoder,
   wherein the video encoder is configured to:
      receive a set of pictures;
      encode a first picture of the set of pictures in a compressed bit stream as a first encoded picture having a first picture type;
      reconstruct the first encoded picture to generate a reconstructed picture;

encode a second picture of the set of pictures in the compressed bit stream as a second encoded picture, wherein the second picture is encoded based on the reconstructed picture as a second picture type, and wherein the second picture type is different than the first picture type;

transmit the first encoded picture at a first rate; and transmit the second encoded picture at a second rate, wherein the first rate is different from the second rate and the second rate is based on a number of pictures between the second encoded picture and a refresh picture.

11. The system of claim 10, wherein the video encoder is configured to encode the first picture as a P-picture in the compressed bit stream.

12. The system of claim 10, wherein the second picture is selected as a number Z pictures after the first picture in the set of pictures.

13. The system of claim 10, wherein the network interface is configured to:

transmit the first encoded picture to a video decoder in real time; and transmit the second encoded picture to the video decoder as a delayed transmission in non-real time;

wherein the video decoder is configured to:

decode the first encoded picture to generate a decoded first picture; and decode the second encoded picture using the decoded first picture; and wherein the second picture is selected so that the first encoded picture will be received and decoded by the video decoder before the video decoder begins decoding the refresh picture.

\* \* \* \* \*